United States Patent
Zimmerman

[15] 3,685,356
[45] Aug. 22, 1972

[54] GRANULAR SOLIDS INDICATOR FOR VERTICAL VESSELS

[72] Inventor: Robert V. Zimmerman, 10655 Tancred, Denver, Colo. 80234

[22] Filed: July 9, 1971

[21] Appl. No.: 161,189

Related U.S. Application Data

[63] Continuation-in-part of Ser. No. 826,182, May 20, 1969, abandoned.

[52] U.S. Cl. ............... 73/290, 116/114 B, 200/61.21
[51] Int. Cl. ............................................. G01f 23/00
[58] Field of Search ..... 73/290, 317; 116/114, 114 B, 116/118; 200/61.2, 61.21

[56] References Cited

UNITED STATES PATENTS

| | | |
|---|---|---|
| 2,260,661 | 10/1941 | Emdgrud .................... 73/317 |
| 3,286,053 | 11/1966 | Capra ..................... 200/61.21 |
| 3,290,462 | 12/1966 | Watkins .................. 200/61.21 |

*Primary Examiner*—Louis Capozi
*Attorney*—Richard D. Low

[57] ABSTRACT

A level indicator for granular solids contained in vertical vessels includes a feeler arm which is arranged to ride on the side of a conical pile of granular solids, moving with the level changes of the pile of granular solids. A motion transmitter attached to the feeler arm transfers movement of the feeler arm to an indicator and/or control means for the pile of granular solids.

11 Claims, 8 Drawing Figures

INVENTOR
ROBERT V. ZIMMERMAN
BY
Richard D. Law
ATTORNEY

INVENTOR
ROBERT V. ZIMMERMAN
BY
Richard D. Law
ATTORNEY

INVENTOR
ROBERT V. ZIMMERMAN
BY
Richard D. Law
ATTORNEY

GRANULAR SOLIDS INDICATOR FOR VERTICAL VESSELS

This application is a continuation-in-part of U.S. application Ser. No. 826,182, filed May 20, 1969 and now abandoned.

A number of process industries utilize granular solids in one or more processes, for example the cement industry, the line industry, the coke industry, etc. For effective operation, the involved processes are preferably continuous. In an effective continuous process, the granular solids entering the process are preferably fed at a constant and known rate which permits accurate control of other ingredients entering the process. The granular solids are either fed from a surge bin into a reaction vessel, or are fed directly into a reaction vessel, but in either case it is highly desirable to maintain a constant and known level in the reaction vessel. There are several devices available to detect the presence or absence of solid material at a given level. These may be of a type utilizing a motor-driven reciprocating plunger, a suspended weight on a motor-driven drum, a pressure sensitive diaphragm, a radioactive source and detector, an electrical capacitance probe, ultrasonic beam generator and detector, etc. These devices have a common disadvantage in that they are too delicate, are too expensive and normally too complicated for field use in the environments of dust, vibration, wide temperature fluctuations, moisture, unskilled operators or the like, normally found in process industries and particularly where solid and granular material is processed. In certain cases, the primary sensing elements enumerated above have been tried in a system of multiple elements which would include timers, level indicators, and the circuitry for such timers, recorders, and indicators. However, such systems have not proved to be dependable and accurate enough for responsive regulation of the rate of solids flow in the processes.

According to the present invention, there is provided a means for sensing the level of a conical pile of material in vessels or free standing which includes a feeler arm resting on the side of the pile, which arm is arranged to pivotally move with variations in the level of the conical pile, and the motion of this feeler arm is transmitted by a suitable mechanism to a motion transmitter activating such circuits as a pneumatic, hydraulic, electrical or a combination circuit for the detection, indication and/or control of the level of the pile. For utilizing the devices of the invention, it is important that feed onto the conical pile be arranged so that granular solids are introduced onto the pile at one point to accumulate the solids in a conical pile, the sides of which are at an angle which is the angle of repose of the solid granular material. The probe or feeler arm is arranged to rest on the side or the slope of the granular pile and as the height of the pile varies the feeler arm varies with actual movement with the level variation of the side of the conical pile. The motion of the feeler arm is then transmitted by a suitable mechanism to actuate a motion transmitter or a motion translator.

Included among the objects and advantages of the present invention is a primary sensing device of sensing the level of a conical pile of granular material.

Another object of the invention is to provide a level indicator for continuously translating level changes in a pile of granular material into a signal which is proportional to the level of the pile.

A further object of the invention is to provide a probe for a conical pile of granular material which is arranged to rest on the side of the pile and to change position with the movement of the side of the pile and level changes thereof.

These and other objects and advantages of the invention may be readily ascertained by referring to the following description and appended illustrations in which.

Figure 1:
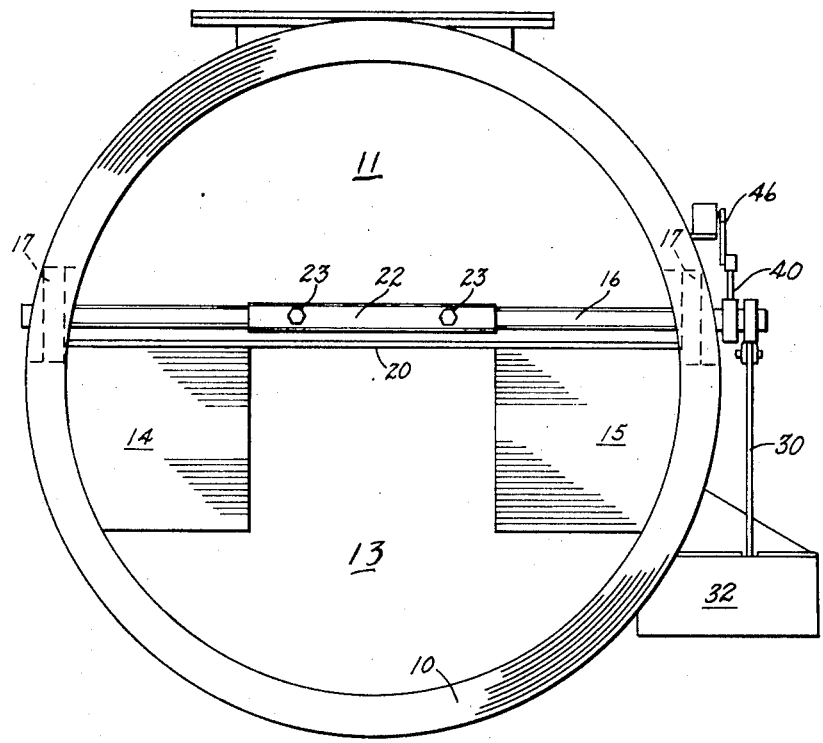
FIG. 1 is a top plan view of a mounting arrangement of a feeler arm according to the invention for attachment to a vertical vessel.
Figure 2:
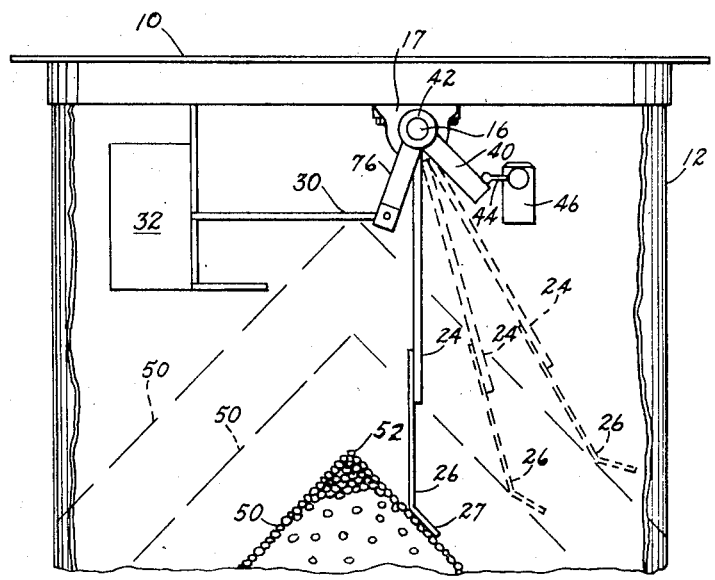
FIG. 2 is a side elevational view of the device of FIG. 1, illustrating positioning and movement of a feeler arm according to changes in level of the conical pile of granular material.

In the device illustrated in FIGS. 1–6, a partially open top 10 is mounted on cylindrical portion 12, providing a feed supply for a vessel therebelow. The top provides a closed section 11 and an open section 13. The vessel or vertical chamber may be of any shape desired. A pair of sloped plates 14 and 15 provide a feed chute into the cylinder 12. A shaft 16 is mounted on the top extending thereacross, supported in a pillow block 17 at each side, which are mounted on a circumferential framework 18 around the top. A plate 20 extending from the top to the bottom of the slope plates 14 and 15 provides a three-sided feed chute into the tubular member 12. Bolted to the shaft 16 is a sleeve 22, by means of bolts 23, and secured to the sleeve are a pair of depending arms 24 which extend downwardly into the tubular member 12. Mounted on the bottom of the arms 24 is a feeler plate 26, secured by bolts 28 to each arm. The plate 26 has an edge 27 which is broken from the line of the plate and which is arranged to ride on the slope of a pile of material, explained below. As illustrated in FIG. 1 and FIG. 2, a connecting arm 30 is attached to linkage arm 76 and the arm 30 extends into a transmitter enclosure 32, which may be any type of transmitter actuated by motion of a connector rod. Linkage arm 76 is clamped to pivot shaft 16 so that the motion of feeler plate 26 can be sensed by an externally located motion transmitter 32 which transmits the reciprocating motion of arm 30 into a usable signal which may be mechanical or electrical as is conventional.

Figures 4, 5, 6:
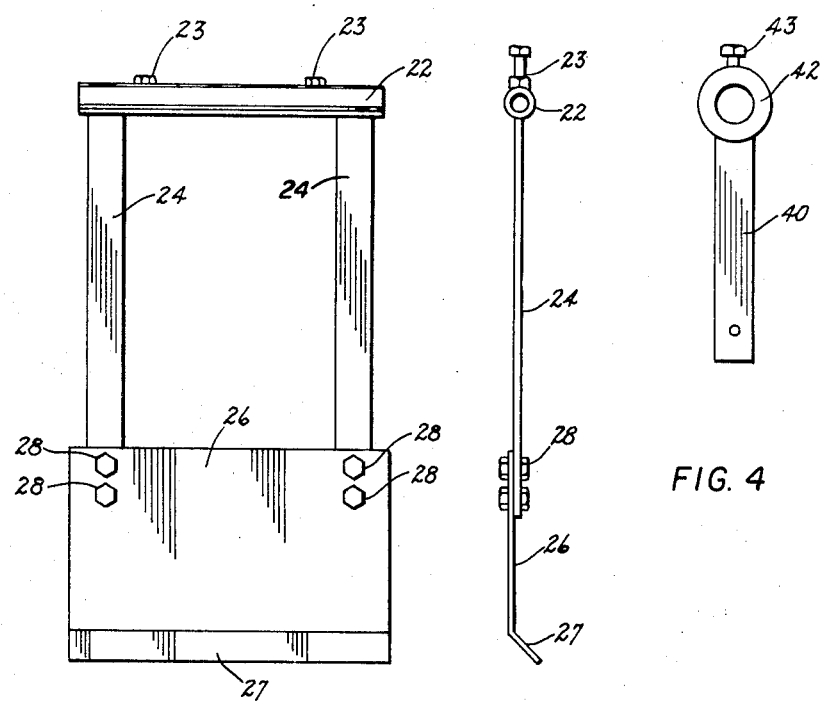
FIG. 4 is detail, side elevation of a switch lever arm for a controller actuated by the device of the invention.
FIG. 5 is a plan view of a feeler arm for use in a detector according to the invention.
FIG. 6 is a side elevational view of the feeler arm of FIG. 5.

IN some instances, it may be desirable to provide a limit switch on the feeler arm which will actuate a mechanism for reducing or stopping feed into the top opening 10. For such purpose, a linkage arm 40, shown in detail in FIG. 4, is secured to a sleeve 42 which is held on the shaft 16 by means of a bolt 43. The limit switch arm 40 is arranged to strike a rider 44 (FIG. 2) which is attached to a switch 46. The switch may be an electrical switch, a pneumatic valve or the like connected to the feed control mechanism which is arranged to feed into the opening 10, and thereby provides means for controlling the feed on extreme variations of height of the conical pile in the bin.

As illustrated in FIG. 2 a pile of granular material 50 assumes a conical shape due to the feed falling on the top 52 of the pile, with the side of the cone at about the angle of repose of the granular material. The bent tip 27 rides on the side of the pile, and as the pile height fluctuates the plate 26 moves outwardly and inwardly towards the pile center. The movement of the plate 26 transmitted through linkage arm 76 causes movement of the connector rod 30 and this movement is utilized to actuate mechanism in the transmitting device 32. In the actual use of the device, feed is initially introduced into the vessel, generally by manual control, until the level is near the top of the vessel and is within the measuring and controlling range of the feeler plate 26. When the level of the pile of material in the vessel is low, the plate is suspended directly below the pivot, and a rising level of the granular material will push the plate sideways due to the contact of the bent section on the slope of the conical pile.

Figure 3:
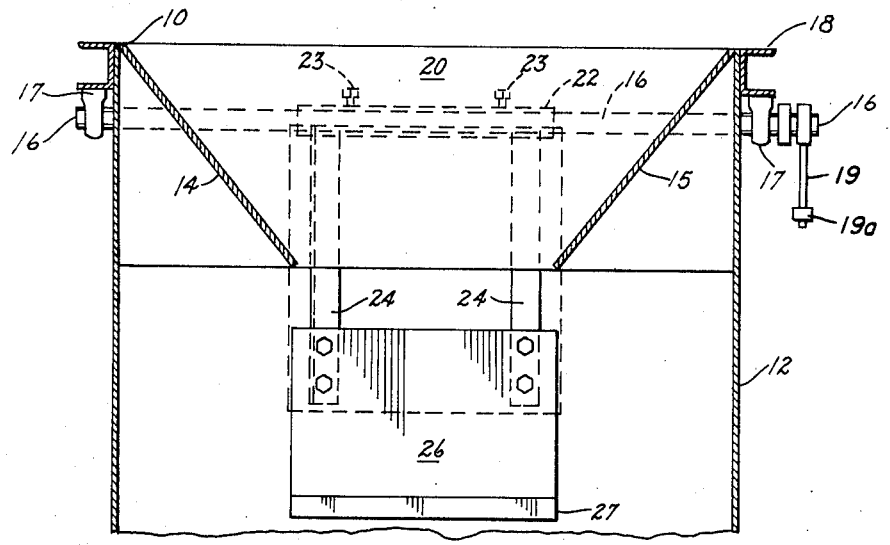
FIG. 3 is a side elevational view of the device of FIG. 1, taken 90° to the view of FIG. 2.

The preferred angular displacement of the feeler plate from vertical is in a range from about 5° to 60° so that the weight of the plate holds it firmly against the rising and falling granular surface. The angle may be increased by shortening the plate support rods, and this provides an adjustment for the device. The force of contact of the plate against the conical material may, also, be controlled by use of a lever arm with a weight on the lever arm. For lightweight material such as grain, light powders, and the like it is advantageous to decrease the weight of the sensing plate by the use of a counterbalance, spring, magnetic detent or the like. A simple counterbalance is shown in FIG. 3, where a lever arm 19 is secured to the shaft 16 in opposition to movement of the sensing plate 26, and a weight 19a may be picked to balance the plate in relation to the pile. Lever arm 19 is at an appropriate angle to arms 24 to achieve this balance.

A further adjustable parameter is the selection of the direction of motion to be transmitted by the sensing plate support arms. Thus the direction of motion of the connector arm may be other than horizontal as shown in FIG. 2, and by a combination of pivot arm radius and direction of motion adjustments, the vertical movement of the bed may be made to produce non-linear outputs, for example, controlling pneumatic, hydraulic pressures as desired. When matched with non-linear hydraulic valve characteristics, the system will provide a solids flow control of considerable stability and response.

The control system for the instrumentation and the controlling of the feed into the vertical vessel as well as the control of the discharge of the material from the vertical vessel may utilize components of control systems operated by various sources of energy, for example, electrical, hydraulic, air, steam, and the like. As pointed out above the device may be used to start, stop and control the rate of feeders for the granular material such as vibratory feeders, screw feeders, star feeders, rotary valves, and other conventional feeding and/or withdrawing mechanisms from the vessel.

Figure 7:
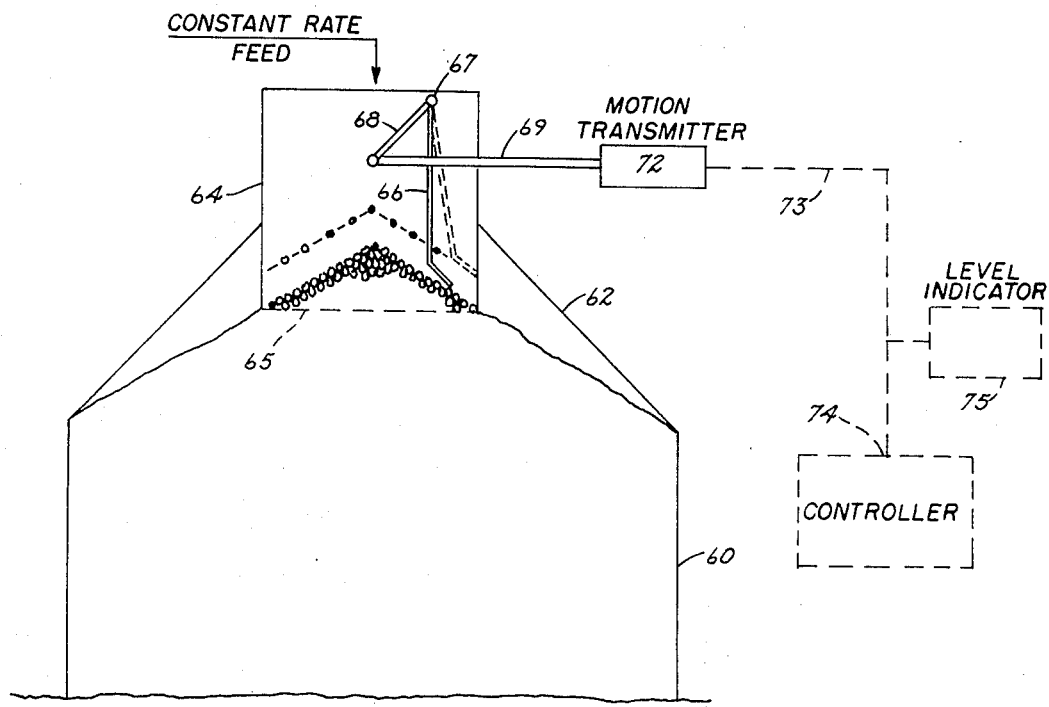
FIG. 7 is a schematic side elevational view of a modified form of level detector mounted in a vertical vessel illustrating the control circuit for the level of granular material in the vertical vessel.

In a slightly modified form, shown in FIG. 7, a vertical vessel 60, for containing a quantity of granular material has a conical top 62 which extends up to an inlet tubular member 64. The bottom outlet 65 of the tubular member 64 extends into the vessel 60 below the sloped top 62 to provide an inlet passage and for containing a small conical pile of the material in the tube 64. A sensor plate 66 is suspended from a pivot shaft 67, and it permits the sensor plate 66 to move sideways on variations of height of a conical pile in the tube 64. A lever arm 68 is attached to the pivot shaft in such a manner that it moves pivotally with the pivotal movement of the plate 66. A connector rod 69 is connected to the pivot 68 and it terminates in a motion transmitter 72. The motion of the connector rod may be transmitted into various energy forms and these are transmitted by a line 73 to a controller 74 and/or a level indicator and recorder 75. Where feed is entered at a constant rate, the controller will control the rate of discharge of treated material from the vessel. With a constant weighed feed into the vessel and a controlled level in the vessel, equilibrium may be maintained. Minor variations can be expected in certain types of material where a change in the bulk density occurs, and this will cause minor variations in the volumetric feed rate. Such variations are easily taken care of with the controller on the discharge mechanism.

Figure 8:
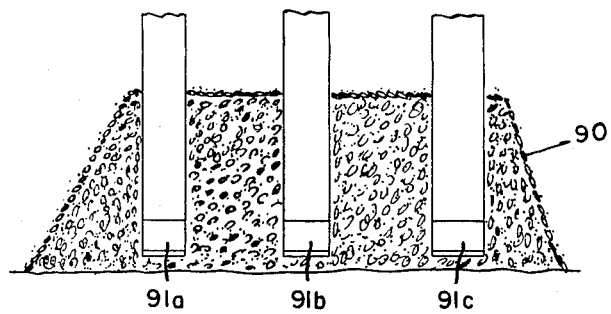
FIG. 8 is a side elevational view of a series of indicators positioned along one side of an elongated material pile having sloped sides.

The pile of granular material may be contained in a vessel with a single feed inlet to produce the conical pile, using one sensor unit on the pile. A free standing pile is, also, amenable to the use of sensor. An elongated pile, such as made by an ore bridge, may utilize a series of such sensors, providing a control on the feeding of granular material onto the pile. An elongated pile 90, FIG. 8, has a series of sensors 91a, 91b and 91c positioned against the side of the pile, as described for the sensor of FIG. 2. Each of the sensors independently indicates the condition of the portion of the pile on which the sensor is resting.

I claim:

1. A granular solids indicator for a pile of material onto which granular solids are fed to form a pile with sloped sides; comprising a generally planar sensing member having a portion bent from its plane at about the angle of the slope of the side of said pile arranged to ride on the side of such a pile of granular solids; means for pivotally mounting said sensing member permitting it to pivotally move with height movement of said pile; and means connected with said pivotal mounting means continuously moving in relation to movement of said sensing member.

2. A granular solids indicator according to claim 1 wherein said sensing member is suspended from an overhead pivotal shaft mounting.

3. A granular solids indicator according to claim 1 wherein said planar sensing member is a rectangular plate having its lower edge bent from its plane at about the angle of the slope of the side of said pile.

4. A granular solids indicator according to claim 3 wherein said sensing member is mounted on a pair of arms pivotally suspended from an overhead shaft.

5. A granular solids indicator according to claim 4 wherein said means associated with said pivotal mounting means is a lever arm attached for reciprocable movement with said sensing member.

6. A granular solids indicator according to claim 1 further characterized by said means associated with said pivotal mounting means connected to a motion transmitter.

7. A granular solids indicator according to claim 1 wherein the angular displacement of said sensing member is from 5° to 60°.

8. A granular solids indicator according to claim 2 wherein means for pivotally mounting said sensing member is counterbalanced to decrease the weight of the sensing member on the pile of granular material.

9. A granular solids indicator according to claim 1 wherein said means associated with said pivotal mounting moves substantially horizontally on pivotal movement of said sensing member.

10. A granular solids indicator according to claim 1 in which said pile has a single feed point, producing a conical pile.

11. A granular solids indicator according to claim 1 in which said pile has an elongated feed line forming an elongated pile with sloped sides, and series of indicators are positioned along at least one side of said pile.

* * * * *